United States Patent [19]

Ballendux

[11] 4,312,434
[45] Jan. 26, 1982

[54] DOUBLE ACTING PISTON FOR HYDRAULIC CLUTCHES

[75] Inventor: Gerardus M. Ballendux, Waukesha, Wis.

[73] Assignee: Allis-Chalmers Corporation, Milwaukee, Wis.

[21] Appl. No.: 104,006

[22] Filed: Dec. 17, 1979

[51] Int. Cl.³ .............................................. F16D 25/10
[52] U.S. Cl. ................................................. 192/87.17
[58] Field of Search ............... 192/87.17, 70.28, 87.16, 192/87.15, 87.14

[56] References Cited

U.S. PATENT DOCUMENTS 3,064,781  11/1962  Schwartz et al. ................. 192/87.17
3,566,707  3/1971  Schulz .......................... 192/87.17 X
3,791,500  2/1974  Stefanutti ....................... 192/87.17

FOREIGN PATENT DOCUMENTS 757190  10/1952  Fed. Rep. of Germany ... 192/87.17
2316571  10/1973  Fed. Rep. of Germany ... 192/87.17
335463  5/1972  U.S.S.R. ......................... 192/87.17

Primary Examiner—George H. Krizmanich
Attorney, Agent, or Firm—Arthur L. Nelson

[57] ABSTRACT

A double acting hydraulic actuator for hydraulic clutches having a single piston for selectively actuating each of the hydraulic clutches. The hydraulic actuator includes a hydraulic cylinder in which a single piston is positioned which reciprocates to operate a hydraulic clutch in one direction and a second hydraulic clutch in the other direction.

8 Claims, 2 Drawing Figures

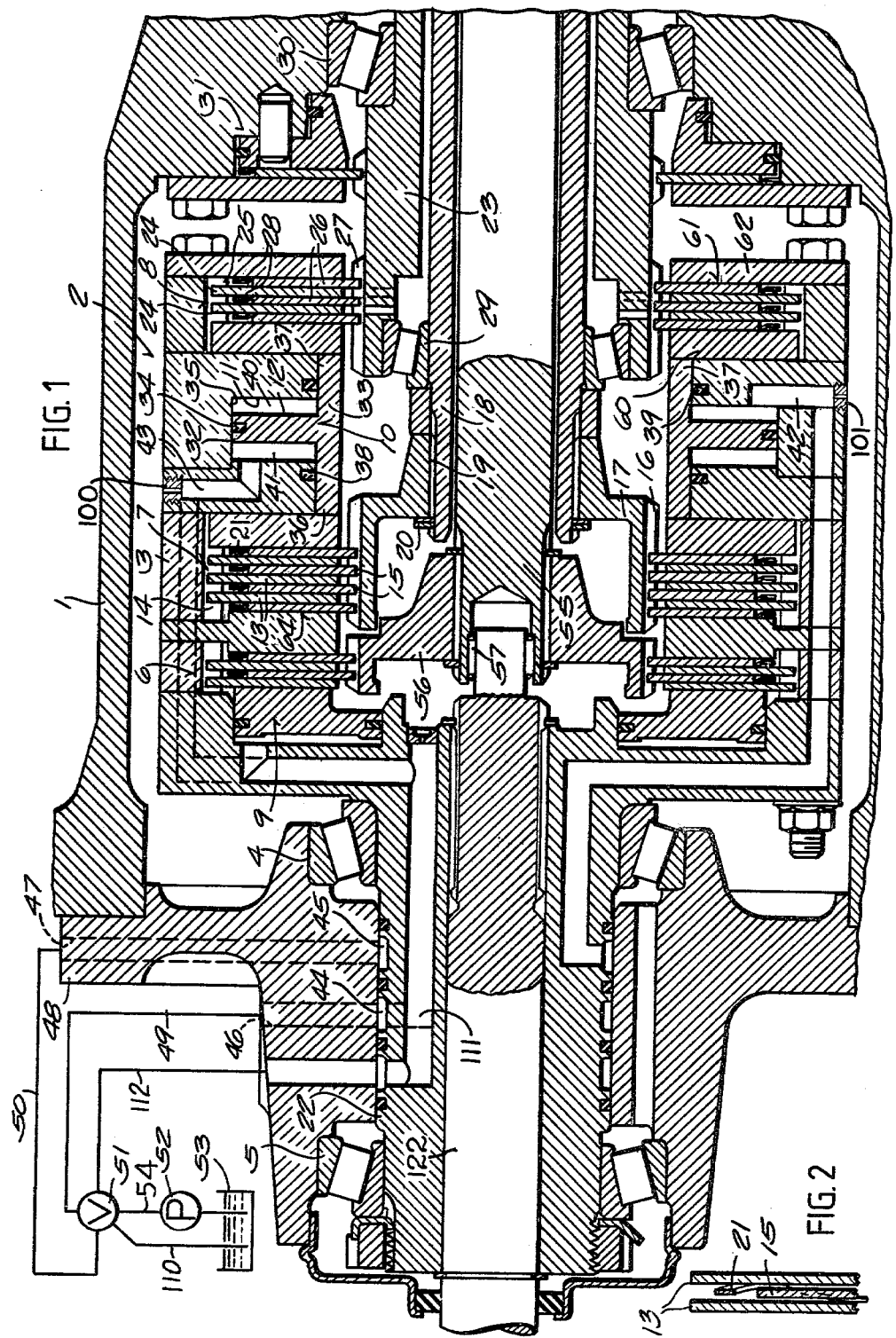

DOUBLE ACTING PISTON FOR HYDRAULIC CLUTCHES

This invention relates to hydraulic clutches and more particularly to a double acting hydraulic piston in a hydraulic cylinder for selectively actuating each of two hydraulic clutches. The hydraulic actuator is positioned between two clutch packs to selectively actuate one or the other clutch depending on the direction or movement of the hydraulic piston.

Hydraulic clutches in the power shift transmissions are usually operated by annular hydraulic cylinders and pistons which tend to carry a residual amount of hydraulic fluid even when the clutch is released. The weight of the fluid produces a centrifugal force which tends to delay disengagement of the clutch and maintain a drag on the clutch even though the clutch is manually released.

Power shift transmissions selectively shift hydraulic clutches to selectively engage various gear ratios in driving of the vehicle. Simultaneous engagement of the engaging and disengaging clutches, as the clutches are shifted, can cause double engagement in which both clutches are engaged and they are acting in opposition to each other. This tends to produce excessive wear on the clutch discs and may cause early failure and reduce the life and reliablity of the clutch. With reference to the delayed disengagement of the clutch due to the centrifigal forces of the fluid in the hydraulic actuator, check valves and relief valves have been used to minimize the effect of the drag on the clutches as they are released. This does improve the operating conditions of the clutch. Simultaneous engagement of the one clutch releasing and the other engaging if the overlap is too great, can only be controlled by better timing of the clutches and monitoring of the clutch pressures to provide a better transition from one clutch to the other. Accordingly, the applicant has provided for a double acting hydraulic actuator which operates two clutches by a piston reciprocating in the actuator to selectively engage one clutch or another depending on the movement of the piston. This clutch eliminates the simultaneous engagement of the two clutches as the power is transferred from one clutch to the other. The centrifugal forces which tend to hold the clutch engaged and cause a drag on the clutch although it is manually released are eliminated. The clutches are actuated selectively and alternatively and only one clutch can be engaged at a time. The forces of the hydraulic fluid are ineffective in producing any drag on the clutch.

Accordingly, it is an object of this invention to provide a double acting hydraulic piston in a hydraulic actuator of a clutch.

It is another object of this invention to provide a double acting hydraulic actuator having a single piston to selectively reciprocate in two directions to selectively operating each of two clutches.

It is a further object of this invention to provide a double acting piston in a hydraulic actuator for selectively actuating each of two hydraulic clutches by selective movement in a reciprocating manner in one direction or the other.

The objects of this invention are accomplished by providing a double acting hydraulic actuator between two hydraulically actuated clutches. A single annular piston forms two pressurizing chambers in the hydraulic cylinder and annular clutch carrier. The piston reciprocates to selectively operate one or the other of the two hydraulic clutches and as one engages the other disengages. This eliminates any possibility of simultaneous engagement of the two clutches and also eliminates the effect of centrifugal forces in the rotating fluid of any hydraulic actuator which may cause a residual drag on conventional clutches.

Referring to the drawing, the preferred embodiment of this invention is illustrated.

FIG. 1 of the drawing is a view showing a cross section of the hydraulic transmission with a double acting hydraulic actuator positioned between two hydraulic clutches.

FIG. 2 is a cross section view of a wave spring between two outer clutch discs with the clutch released.

Referring to the drawing, the transmission housing 1, encloses the clutches of the power shift transmission 2. A clutch carrier 3, is rotatably mounted on the bearing assemblies 4 and 5. The clutch carrier 3 includes hydraulic clutches 6, 7 and 8. The clutch 6 is actuated by a hydraulic actuator 9. The hydraulic clutches 7 and 8 are actuated by a double acting hydraulic actuator 10 which includes a hydraulic cylinder 11 and piston 12. The hydraulic clutch 7 includes clutch discs 13 which are mounted on a spline on the inner periphery 14 of the clutch carrier 3. The inner clutch discs 15 are carried on the splines 16 of the clutch hub 17. The clutch hub 17 is connected to the quill shaft 18 through a spline connection 19 and retained axially in position by the snap rings 20. The clutch discs 13 and 15, when disengaged, are retracted by the plurality of wave springs 21 alternately interweaved between the discs 13. The input drive for the clutch comes through the input shaft 122 and drives through quill shaft 22 and the clutch carrier 3. The output of the clutches drives through the quill shafts 55, 18 and 23.

The hydraulic clutch 8 includes the clutch discs 24 carried on splines 25 on the inner periphery of the clutch carrier 3. The inner discs 26 are carried on the spline 27 of the quill shaft 23. Spaced between the discs 24 are waves springs 28 which retract the clutch discs 24 when the clutch is disengaged.

The quill shaft 23 is rotatably mounted on the bearing assembly 29 and bearing assembly 30. The brake 31 brakes the quill shaft 23 when it is engaged.

The double acting hydraulic actuator 10 is formed by the hydraulic cylinder 11 receiving the piston 12. The piston 12 and hydraulic cylinder 11 form annular clutches. The cross section of the piston 12 is a inverted T-shaped configuration. The base 32 of the T 33 carries the seal 34 which engages the recessed portion 35 in the form of the cylinder 11. The clutch engaging flanges 36 and 37 each engage a seal 38 and 39 in the hydraulic cylinder 11. This in turn forms pressurizing chambers 40 and 41. The pressurizing chambers 40 and 41 are in communication with passages 42 and 43 as shown. These passages in turn extend through the clutch carrier 3 to the quill shaft 22 to annular recesses 44 and 45 which are in communication to external passages 46 and 47 in the housing 48. The passages 46 and 47 are in communication with the conduits 49 and 50. Conduits 49 and 50 are selectively operated through a valve 51 which is in communication with a pump 52. The pump 52 is in communication with a reservoir 53 and the pump discharged passage 54 which leads to the valve 51. The valve is manually operated to selectively engage any of the clutches shown in this view.

The output of the clutches drive through the output shaft 55 or either of the quill shafts 18 or 23 depending on the clutch that is engaged. The quill 18 is rotatably mounted in the bearing assembly 29 and another bearing between the quill shaft 23 and quill shaft 18, not shown. The quill shaft 18 and clutch hub 17 transmit power from the clutch 7. The clutch hub 56 of the clutch 6 and shaft 55 are rotatably mounted on the needle bearing 57 and the bearing on the right-hand end of the shaft 55 not shown. The output shaft 55 transmits the power to the output of the power shift transmission.

The operation of the device will be described in the following paragraphs.

The hydraulic actuators are controlled through the valve 51 and either of the hydraulic clutches 7 and 8 can be actuated through this valve. For the purpose of illustration, the hydraulic clutch 8 will be described. As the pressure from the pump discharge passage 54 of the pump 52 is supplied from valve 51 to the hydraulic actuator and the pressurizing chamber 41 the piston 12 moves to the right. The clutch engaging portion 37 presses against the pressure plate 60 compressing the clutch pack 61 against the reaction plate 62. As the clutch discs engage, the clutch transmits power from the clutch carrier 3 to the output or the quill shaft 23. During operation of the hydraulic actuator, fluid in the pressurizing chamber 41 is transmitted through the connecting passage 43. As long as the pressure is present in the pressurizing chamber 41, power is transmitted through the transmission to the output of the transmission.

When the control valve 51 releases the clutch 8 by relieving the pressure in the pressurizing chamber 41, fluid is returned through passages 43 and 111, conduits 112 and 110 to reservoir and the piston 12 returns to its neutral position. This is partially caused by the release in pressure in the pressurizing chamber 41 and also the force of the wave springs 28 which are interweaved between the clutch discs 24. The clutch pack is then free of frictional engagement and the discs rotate freely. The centering force of the wave springs 28 in the clutch pack 61 and the wave springs 21 of the clutch pack 64 provide a neutral position for the piston 32. Pressurized fluid is released from the chamber 40 and the centrifugal force on the fluid in the pressurizing chambers 40 and 41 is neutralized and vented through vents 100 and 101. There is no drag on either of the clutch packs 61 and 64.

When the hydraulic clutch 7 is operated the reverse situation is true, the pressurized fluid in the pressurizing chamber 40 moves the piston 12 in a left-hand direction to engage the clutch pack 64. Hydraulic fluid is released from pressurizing chamber 41 through the valve 5 and a portion is vented through vent 100. There can be no simultaneous engagement of the two clutches and the centrifugal force which may tend to cause drag is neutralized by the operation of a single piston in the double acting hydraulic actuator. The double acting hydraulic actuator serves to operate either of the clutch packs 61 or 64 and when the pressurized fluid is released from these hydraulic clutches, they are free to rotate with no drag and the reliability of the clutch is extended.

The embodiment of the invention in which an exclusive property or privilege is claimed are defined as follows:

1. A double hydraulic clutch system comprising, a first clutch pack and a second clutch pack, a double acting hydraulic actuator disposed between said clutch packs, said hydraulic actuator including a hydraulic cylinder forming a hydraulic chamber, a hydraulic piston extending into said hydraulic chamber to form a first and second fluid pressurizing chamber, a vent passage extending to the periphery of said cylinder and in continuous communication from each of said pressurizing chambers, return springs for centering said piston when pressure is released in said pressurizing chambers, a clutch actuating portion extending from said piston toward each of said clutch packs to selectively and alternatively engage each of said clutch packs, a hydraulic clutch actuating system including a source of pressurized fluid, a reservoir supplying fluid to said source of pressurized fluid, a control valve selectively and alternatively directing pressurized fluid to each of said pressurizing chambers and venting fluid from said chambers to the reservoir for selectively engaging and disengaging said clutches.

2. A double hydraulic clutch system as set forth in claim 1 wherein said double acting hydraulic actuator defines an annular hydraulic actuator.

3. A double hydraulic clutch system as set forth in claim 1 including a clutch carrier for carrying said clutches, said clutch carrier defining an inner peripheral chamber forming said pressurizing chambers.

4. A double hydraulic clutch system as set forth in claim 3 wherein said piston defines a T-shaped cross section with a base of the T extending into said hydraulic chamber and the arms of the T forming clutch engaging portions.

5. A double hydraulic clutch system as set forth in claim 1 including a clutch carrier carrying said hydraulic clutches, said clutch carrier forming said hydraulic cylinder, a T-shaped piston with the base portion of the T extending into said hydraulic cylinder to form said pressurizing chambers.

6. A double hydraulic clutch system as set forth in claim 1 wherein said piston defines a T-shaped cross section with a base portion extending into said hydraulic chamber to define said pressurizing chambers, the arms of said T forming the clutch actuating portions of said hydraulic piston.

7. A double hydraulic clutch system as set forth in claim 1 wherein said clutch carrier forms internal passage means entering said pressurizing chambers on the external periphery of said chambers to relieve and pressurize fluid in said pressurizing chambers.

8. A double hydraulic clutch system as set forth in claim 1 including passage means connecting said pressurizing chambers on the external periphery of said recess to pressurize and relieve said hydraulic actuator, venting means on the external periphery of said cylinder connected to said passage means, passage means in said clutch carrier and said input shaft to selectively convey pressurized fluid to said pressurizing chambers and to relieve the pressure in said pressurizing chambers when said clutch is disengaged.

* * * * *